(12) United States Patent
Wang et al.

(10) Patent No.: US 8,254,362 B2
(45) Date of Patent: Aug. 28, 2012

(54) METHOD AND DEVICE OF GENERATING TIME-VARYING PREAMBLE SEQUENCE AND PSEUDORANDOM NOISE (PN) BINARY SEQUENCE IN DIRECT SEQUENCE SPREAD SPECTRUM (DSSS) COMMUNICATIONS

(75) Inventors: Xinyu Wang, Newbury Park, CA (US); Igor Elgorriaga, Los Angeles, CA (US); Marcus R. Gahler, Redmond, WA (US); Robert P. Higgins, Seattle, WA (US); Yefim Poberezhskiy, San Diego, CA (US); Paul R. Norris, Issaquah, WA (US); Brian J. Hatley, Issaquah, WA (US); Michael S. Foster, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 836 days.

(21) Appl. No.: 11/971,429

(22) Filed: Jan. 9, 2008

(65) Prior Publication Data
US 2009/0175258 A1 Jul. 9, 2009

(51) Int. Cl.
*H04J 3/02* (2006.01)
(52) U.S. Cl. .................................. 370/345; 370/350
(58) Field of Classification Search .............. 370/342, 370/345, 350
See application file for complete search history.

(56) References Cited

U.S. PATENT DOCUMENTS

| | | | | |
|---|---|---|---|---|
| 5,166,953 | A | * | 11/1992 | Hershey et al. ............... 375/133 |
| 5,519,736 | A | | 5/1996 | Ishida |
| 5,631,922 | A | * | 5/1997 | Sekine et al. .................. 375/140 |
| 5,909,469 | A | * | 6/1999 | Frodigh et al. ................ 370/465 |
| 6,459,722 | B2 | | 10/2002 | Sriram et al. |
| 6,490,267 | B1 | | 12/2002 | Kim et al. |
| 6,542,478 | B1 | | 4/2003 | Park |
| 6,590,889 | B1 | * | 7/2003 | Preuss et al. .................. 370/342 |
| 6,594,680 | B1 | | 7/2003 | Gu et al. |
| 6,816,876 | B2 | | 11/2004 | Jha et al. |
| 7,039,036 | B1 | | 5/2006 | Dabak et al. |
| 7,200,233 | B1 | * | 4/2007 | Keller et al. .................. 380/268 |
| 7,313,164 | B1 | * | 12/2007 | Wilson et al. ................. 375/141 |
| 2002/0181546 | A1 | * | 12/2002 | Odenwalder et al. ......... 375/130 |
| 2003/0043766 | A1 | * | 3/2003 | McDonough et al. ........ 370/335 |
| 2006/0008084 | A1 | * | 1/2006 | Daemen et al. ................. 380/29 |
| 2006/0206776 | A1 | * | 9/2006 | Nieto ............................ 714/755 |

* cited by examiner

*Primary Examiner* — Dang Ton
*Assistant Examiner* — Robert M Morlan

(57) ABSTRACT

Embodiments of the disclosure provide methods, apparatus, and articles allowing two nodes to communicate in a slot-based direct sequencing spreading communication system. Both a preamble sequence and a payload data spreading PN sequence are generated from the Time of Day and a given user code. Generated sequences are synchronized between two communicating nodes to allow slot-based DSSS communication to take place. Generated sequences also change dynamically from slot to slot to provide waveform security.

25 Claims, 6 Drawing Sheets

METHOD AND DEVICE OF GENERATING TIME-VARYING PREAMBLE SEQUENCE AND PSEUDORANDOM NOISE (PN) BINARY SEQUENCE IN DIRECT SEQUENCE SPREAD SPECTRUM (DSSS) COMMUNICATIONS

FIELD

Embodiments of the disclosure relate generally to the field of data communication, and more specifically to time-varying preamble sequence and payload spreading sequence generators for slot synchronization within a wireless communication system.

BACKGROUND

In a wireless communication system environment there is a need for the establishment of secure communications that is resistant to natural interference, jamming, disturbances, interceptions, interferences, and detection.

One method for achieving secure communications within a wireless environment is the use of a modulation technique such as direct sequence spread spectrum (DSSS), where the transmitted signal takes up more bandwidth than the information signal that is being modulated. The carrier signals occur over the full bandwidth (spectrum) of a device's transmitting frequency. Direct Sequence Spread Spectrum (DSSS) employs a pseudorandom noise (PN) binary sequence (interchangeably referred to as "PN sequence" or "PN spreading sequence" herein) to spread-modulate payload data. For binary phase shift keying (BPSK) spread modulation, the PN sequence is a real number sequence, while for quadrature phase shift keying (QPSK) spread modulation, the PN sequence is a complex number sequence occupying both in-phase and quadrature channels. A PN sequence created using PN sequence generators determines statistical properties of a "noise-like" spreading pattern of the signal across the allotted spectrum. For this method to successfully transmit and receive radio signals, both transmitter and receiver must use an identical pseudorandom PN spreading sequence. This signal is transmitted on a bandwidth considerably larger than the frequency content of the original information.

A spread-spectrum transmission offers advantages over a fixed-frequency transmission, the transmissions are highly resistant to narrowband interference, are difficult to intercept, and can share a frequency band with many types of conventional transmissions with minimal interference. The spread-spectrum signals add minimal noise to the narrow-frequency communications in the shared frequency band. As a result, bandwidth can be utilized more efficiently.

PN sequence generators are some of the most critical components in DSSS communications. They generate PN binary sequence with desirable statistical properties. A PN sequence generator traditionally generates a sequence of pseudorandom binary numbers using a linear-feedback shift register (LFSR) structure. In BPSK spread modulation, only one LFSR is needed to generate a real number sequence, while in QPSK spread modulation, two independent LFSRs are required to generate complex number sequences. The LFSR is implemented using several shift registers in tandem with feedbacks selected from various stages of register outputs. A PN sequence generated from a LFSR is solely determined by the LFSR feedback logic connections as represented by a polynomial (interchangeably referred to as LFSR feedback polynomial or PN sequence generator polynomial) and the initial register values in LFSR (interchangeably referred to as seed or initial seed). LFSR feedback polynomial and seed used by a transmitter must be identical to those used at a receiver in order to synchronize DSSS communication. For the purpose of information security, LFSR feedback polynomials and seeds used by a transmitter and receiver pair need to change over time to generate time-varying PN sequences, and for DSSS communication synchronization, requires that changes at the transmitter and receiver must be time-synchronized in lock step.

For security purposes, cryptographic algorithms running at each node of a pair of nodes generate identical non-linear, non-repeating spreading sequences. These cryptographic algorithms require seeds that are known at each node and are identical between any communication pair of nodes. Cryptographic algorithms prove to be very complex, costly and require a large form factor in order to provide the requisite security.

In addition to the PN sequence used for spread modulation of payload data, a preamble sequence is needed at the start of each packet in packet-based DSSS communications. A preamble sequence possesses certain statistical properties to facilitate preamble detection and packet synchronization at a receiver node. For secured DSSS communications, preamble sequences must change from packet to packet, i.e., time-varying. Moreover, the change of preamble sequences must be synchronized in lock-step between a pair of communicating nodes.

In DSSS communications, concatenated sequences have been commonly used as preamble sequences. A concatenated sequence is constructed from a real-numbered outer code sequence and a real- or complex-numbered inner code sequence. For example, For BPSK spread modulation, preamble sequences are constructed from real-numbered inner code sequences; while for QPSK spread modulation, preamble sequences are constructed from complex-numbered inner code sequences, corresponding to in-phase and quadrature channels. Typically, the outer code sequence used to construct preamble sequence is selected a priori from sequences with small side lobes in a-periodic autocorrelation function. Small side lobes help to reduce the probability of false synchronization.

The preamble sequence generation and the PN sequence generation are generally treated separately. For commercial DSSS communication systems, fixed preamble sequences and non-time-varying PN sequences are commonly used. These sequences lack security consideration because of their non-time-varying nature. For military DSSS communication systems, complicated cryptographic algorithms are used to generate non-linear non-repeating sequences for payload data modulation. Although the non-linear non-repeating sequence is highly secure, the communication system is complex with an extra device that hosts cryptographic algorithm.

SUMMARY

It is desirable to develop a method and device that can simultaneously generate time-varying preamble sequence and PN spreading sequence at each node of a pair of communicating nodes in a synchronized manner and with minimal hardware cost.

Illustrative embodiments may describe how a time-varying preamble sequence for packet synchronization and a time-varying PN sequence for spread modulation of payload data may be generated, using a combination of PN sequence generators, read-only-memory (ROM), scramble logic, and control circuitry. Embodiments may include identical pairs of communicating communication nodes, allowing communication to take place between the nodes using a slot synchronization mechanism in DSSS communication system. An example of a slot synchronization mechanism may be, for example, Time Division Multiple Access (TDMA) communications or others.

The generating of both the preamble and the PN spreading sequences among distributed wireless communication nodes may be performed dynamically on a slot-by-slot basis, wherein a preamble sequence and a PN spreading sequence may be changed from one time slot to the next time slot, providing waveform security.

The computations may be effectively synchronized between communicating communications nodes. The computation may include a user code. The user code may be shared by the communication node with another communication node with which the communication node communicates in accordance with a network protocol. The computing to generate the synchronized spreading sequences may also use a Time of Day (ToD) value, which may be obtained from an external source, such as a Global Position System (GPS), at the beginning of every TDMA frame which spans a plurality of TDMA slots.

The computing may combine the ToD and the user code using a binary bitwise method to generate an identical vector (SlotBaseVector) on each node of a communicating pair at a TDMA slot. The SlotBaseVector and an intermediate PN sequence derived from the SlotBaseVector may be scrambled by two independent scramble logics to generate separate PN sequence generator polynomials and seeds that produce, respectively, the PN spreading sequence and the inner code PN sequences. The PN spreading sequence may be used for payload data spread modulation and the inner code PN sequences may be used for preamble sequence construction.

The generated outer code sequence may be computed from the scrambled intermediate PN sequence. The output from the scramble unit may generate an index vector, which in turn, may access a read-only-memory (ROM) wherein a list of outer code sequences may be stored. The outer code sequences, having a set of desirable statistical properties for preamble detection, may be generated a priori through exhaustive sequence search.

A concatenated preamble sequence may be constructed from the above-generated inner code PN sequences and the outer code sequence.

The features, functions, and advantages can be achieved independently in various embodiments of the present inventions or may be combined in yet other embodiments.

BRIEF DESCRIPTION OF THE DRAWINGS

Embodiments of the disclosure will be readily understood by the following detailed description in conjunction with the accompanying drawings. Embodiments of the disclosure are illustrated by way of example and not by way of limitation in the figures of the accompanying drawings.

DETAILED DESCRIPTION

Illustrative embodiments of the disclosure include, but are not limited to, methods, apparatuses, and systems configured to generate time-varying preamble sequences and PN spread sequences for use in wireless communication node 101, communication node 101 being part of a larger wireless communication system. Communication node 101 may communicate with communication node 107 via wireless communication fabric 113, using slot synchronization in accordance with a slot based communication protocol, e.g. a Time Division Multiple Access (TDMA) method of communication with a Direct Sequence Spread Spectrum (DSSS) approach.

Various operations may be described as multiple discrete operations in turn, in a manner that may be helpful in understanding various embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of the embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However "coupled" may also mean that two or more elements are not in direct contact with each other, but yet still cooperate or interact with each other.

For the purposes of the description, a phrase in the form "A/B" means A or B. For the purposes of the description, a phrase in the form "A and/or B" means "(A), (B), or (A and B)." For the purposes of the description, a phrase in the form "at least one of A, B, and C" means "(A), (B), (C), (A and B), (A and C), (B and C), or (A, B and C)." For the purposes of the description, a phrase in the form "(A) B" means "(B) or (AB)," that is, A is an optional element.

The description may use the phrases, "various embodiments," "in an embodiment," or "in embodiments," which may each refer to one or more of the same or different embodiments. Furthermore, the terms "comprising," "including," "having," and the like, as used with respect to embodiments as described in the present disclosure, are synonymous.

Figure 1:
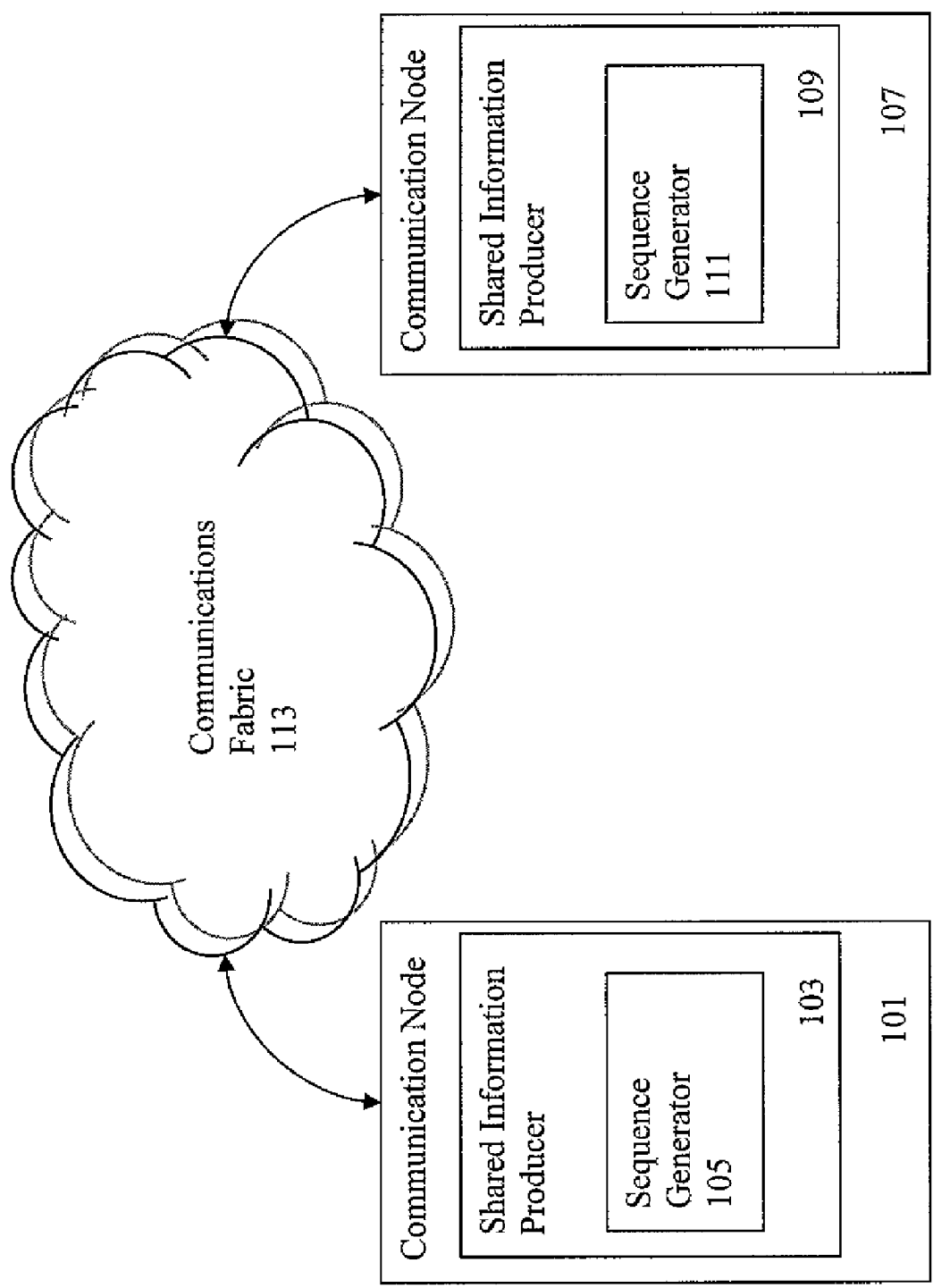
FIG. 1 depicts a communicating pair of nodes, configured to communicate with a communications fabric in accordance with embodiments.

FIG. 1 depicts communicating nodes 101 and 107 in accordance with various embodiments. As illustrated, communication nodes 101 and 107, may communicate with each other through communications fabric 113. Communications fabric 113 may be, in embodiments, a slot based communications system using Time Division Multiple Access (TDMA) slot synchronization. In embodiments, it may be a Direct-sequence spread spectrum (DSSS) communication system. Each communication node 101 and 107, may be capable of transmitting and receiving data. To be able to transmit and receive payload data between nodes 101 and 107, shared information producer 103 within the communication node 101 may be configured to obtain identical (i.e., shared) information as in the shared information 109 within communication node 107.

Shared information producer 103 may be configured to then pass the known information to sequence generator 105, which may be configured to subsequently generate a preamble sequence and a PN spreading sequence. Payload data to be transmitted by the communication node 101 may then be spread modulated by the PN sequence. After appending the preamble sequence, the spread modulated payload data may then be transmitted within a slot through communications fabric 113 to receiving communication node 107. Receiving communication node 107 may be configured to use shared information producer 109 to obtain the same known shared information that the transmitting communication node 101 may be configured to use.

Sequence generator 111 may be configured to use the shared information to generate a preamble sequence and a payload data spreading PN sequence which may be identical to the sequences used by transmitting communication node 101. Receiving communication node 107 may then be configured to use the preamble sequence to detect the arrival signal and subsequently synchronize the de-spreading processing with the arrival signal to recover the original payload data. Embodiments may be configured to perform these operations back and forth between nodes 101 and 107 in both directions as data is passed back and forth through communication fabric 113. Embodiments may be configured to synchronize every slot of the communication system, at which fresh known information may be obtained and applied to generate a new set of sequences, allowing a slot-based DSSS communication using time-varying preamble and PN spreading sequences to enhance waveform security.

Figure 2:
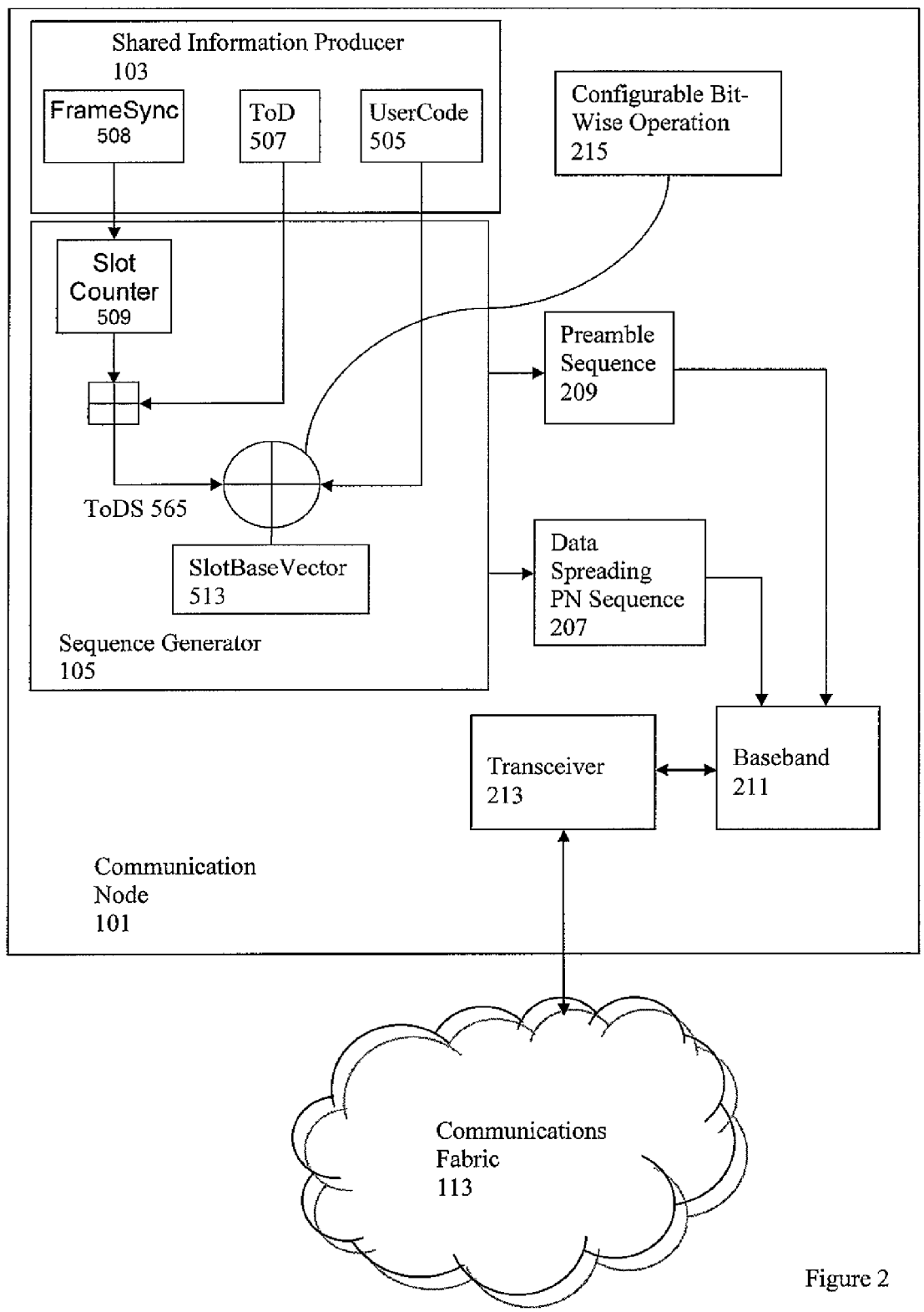
FIG. 2 depicts a communication node configured to communicate with a communications fabric in accordance with embodiments.

FIG. 2 depicts an embodiment of a communication node, communicating with a communications fabric 113 in accordance with various embodiments. Communication Node 101 may include Shared Information Producer 103, Sequence Generator 105, Baseband 211, and Transceiver 213. Shared Information Producer 103 may be responsible to produce identical information at both nodes of a communication pair. Time-of-Day (ToD) 507 and UserCode 505 are shown as examples of the shared information. The Sequence Generator 105 may use the shared information to generate Preamble Sequence 209 and Data Spreading PN Sequence 207. Baseband 211, at transmitting mode, may use preamble and data spreading PN sequences to form a spread spectrum signal comprising a preamble segment and spread spectrum data segment. Baseband 211, operating in a receiving mode, may use preamble and data spreading PN sequences to detect an arrival signal and reconstruct the original data from the arrival signal. Transceiver 213 may transmit signals to, or receives signal from, Communication Fabric 113.

To generate preamble and data spreading PN sequences, Sequence Generator 105 may be configured to use SlotBaseVector 513. SlotBaseVector 513 may be generated in part by configurable bit-wise operation 215, for example an XOR (a bitwise exclusive OR). Configurable bit-wise operation 215 may accept two inputs, one being UserCode 505 and the other being time-of-day of the current slot (TODS) 565 calculated by adding ToD 507 value and an output value from a Slot Counter 509. ToD 507 may be obtained from an external device able to supply an identical ToD to all communication nodes communicating with communication fabric 113.

In embodiment, ToD 507 may be received from a Global Positioning System (GPS) device, and UserCode 505 may be received from an external source known by communication nodes 101 and 107. ToD 507 may be updated every TDMA frame, while the ToDS 565 may be updated every TDMA slot. The communicating pair of communication nodes may then be able to carry out the identical bit-wise operation with an identical ToD 507 and hence ToDS 565, and identical UserCode 505. This may allow for synchronized sequence generation and DSSS communications to take place between the two communication nodes. Using the generated SlotBaseVector 513, Sequence Generator 103 of communication node 101 may creates preamble sequence 209 and Data Spreading PN Sequence 207. These generated sequences may then be used by Baseband 211 to receive or transmit data.

Figure 3:
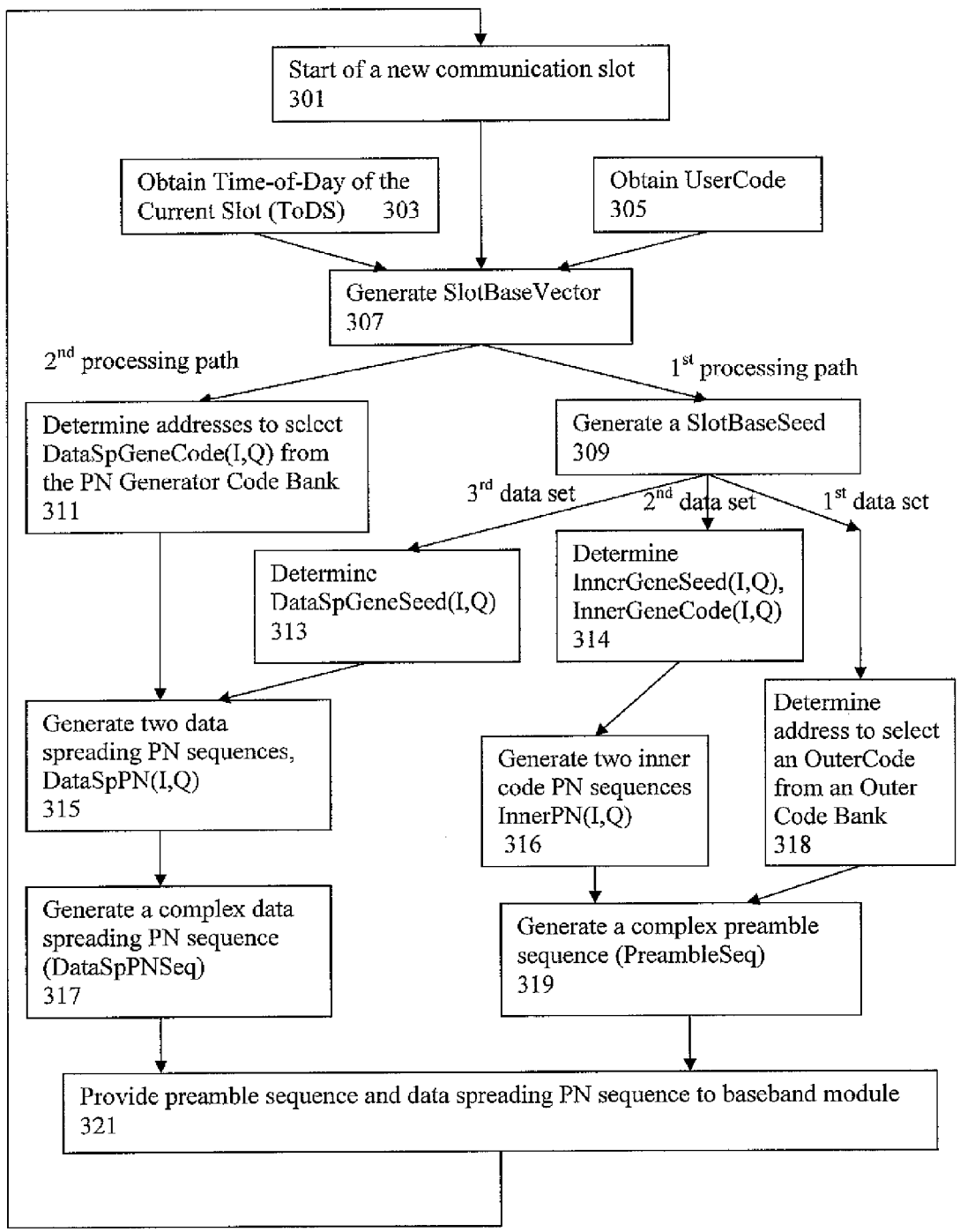
FIG. 3 depicts a flow chart view of a method for generating a preamble sequence and a PN spread sequence on a slot-by-slot basis in accordance with embodiments.

FIG. 3 depicts a flow chart view of a method of generating a preamble sequence and a PN spread sequence on a slot-by-slot basis in accordance with various embodiments. Communication node 101 may wait for the Start Of A New Communication Slot, block 301. At the Start Of A New Communication Slot, Shared Information 103, in communication node 101 obtains Time-of-Day of the Current Slot (TODS) 303 and obtains UserCode 305. UserCode 305 may be provided by an external source to communication node 101 for example, communication fabric 113 or some other source. At the beginning of a communication slot nodes 101 and 107 may have identical UserCode and ToDS. ToDS and UserCode may be used to Generate a SlotBaseVector, block 307. SlotBaseVector may be generated from a bitwise binary operation; all nodes of a communication system may use the same bitwise binary operation to generate SlotBaseVector.

Two communication nodes 101 and 107 may obtain identical information at the beginning of a slot. In embodiments, the obtained information may be ToDS and UserCode. Using identical bitwise binary operations, communication nodes 101 and 107 may be configured to generate an identical SlotBaseVector. The SlotBaseVector may be further processed through two passes.

In a first processing path, the SlotBaseVector may be used to generate a SlotBaseSeed 309. The SlotBaseSeed may then be used to generate three sets of data. The first set of data may be an address to select an outer code, OuterCode, from a random accessible Outer Code Bank database (block 318). The second set of data may include two seeds, InnerGeneSeed (I, Q), and two PN sequence generator polynomials, InnerGeneCode (I, Q) (block 314). The seeds and polynomials may be used by two inner code PN sequence generators to generate two independent inner code PN sequences, InnerPN (I, Q) (block 316). The inner code sequences InnerPN (I, Q) and outer code sequence OuterCode may be used to generate a complex preamble sequence (block 319). The third set of data generated by SlotBaseSeed may include two seeds, DataSpGeneSeed (I, Q), to be used by the data spreading PN sequence generators.

In the second processing path, the SlotBaseVector may be used to generate two addresses to select two PN sequence generator polynomials, DataSpGeneCode (I, Q), from the stored PN Generator Code Bank database (block 311). Both the polynomials DataSpGeneCode (I, Q) and the seeds DataSpGeneSeed (I, Q) from the third data set of the first processing path may be used by data spreading PN sequence generators to produce two independent data spreading PN sequences DataSpPN (I, Q) (block 315) in the in-phase and quadrature channels, which may subsequently form a complex data spreading PN sequence (block 317).

The preamble sequence and data spreading PN sequence generated above may be provided to baseband module (block 321). When the new slot begins the entire process may be repeated. At every TDMA frame interval spanning a plurality number of TDMA slots, the ToD may be updated and new ToD will be used to generate ToDS as described in the sequence Generator 105 with reference to FIG. 2.

Figure 4:
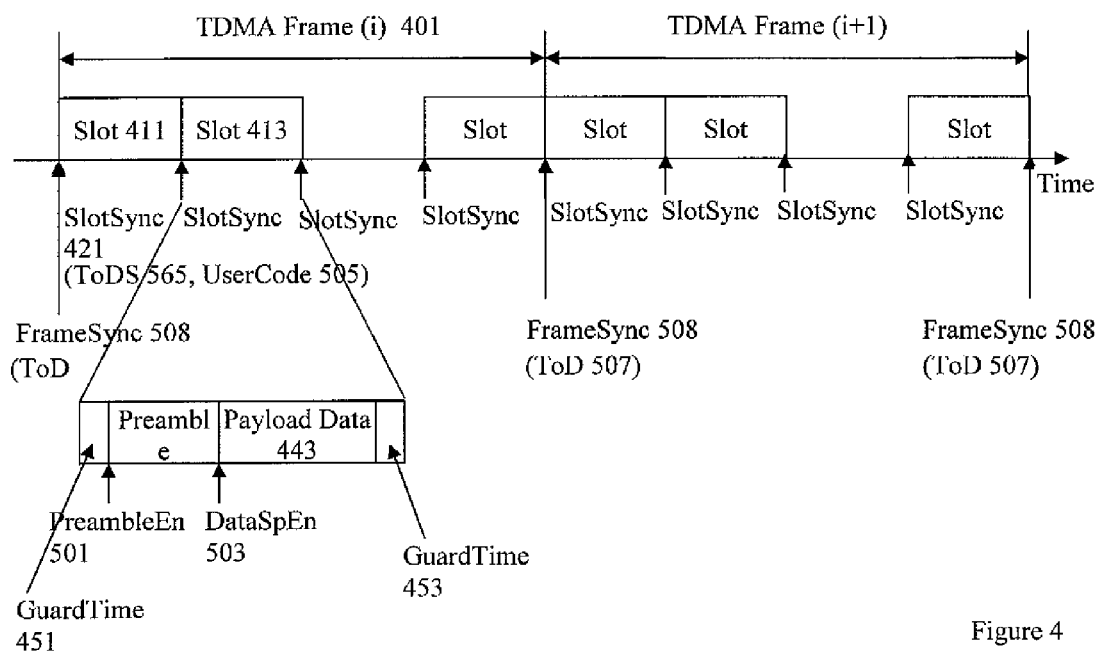
FIG. 4 depicts TDMA timing in accordance with various embodiments.

FIG. 4 depicts an embodiment of TDMA timing diagram in accordance with various embodiments. A TDMA frame may have a plurality of TDMA slots. Two TDMA frame intervals are shown in FIG. 4. The first TDMA frame may start at the arrival of a control signal FrameSync 508. At the same time instance, the Time-of-day (ToD) value may be provided by a GPS system. The FrameSync 508 signal may trigger a control signal SlotSync 421, which marks the start of the first TDMA slot within the current TDMA frame. At each TDMA slot, a UserCode 505 and a time-of-day for the current slot (TODS) 565 derived from the ToD 507 and current slot count, using the method as described in FIG. 2, may be used for preamble and PN spreading sequence generations. Within a TDMA slot, there may be two guard time intervals at the beginning and end portions of a slot as shown by a GuardTime 451 and a GuardTime 453. These two guard time intervals may be designed to absorb the clock uncertainties between the transmitting node and the receiving node of a communicating node pair and to absorb a propagation delay between the node pair. Following the GuardTime 451 interval at the start of a TDMA slot, a control signal PreambleEn 501 may be activated to enable the preamble sequence generation within a time interval of Preamble 441. Immediately after preamble sequence generation is completed, a control signal DataSpEn 503 may be activated to enable the payload data spreading PN sequence generation and the spread modulation or demodulation of the payload data by using the generated PN sequence. This process may occur within a Payload Data 443 interval. The TDMA slot timing and the TDMA frame timings may repeat for every TDMA slot and every TDMA frame, respectively.

Figure 5:
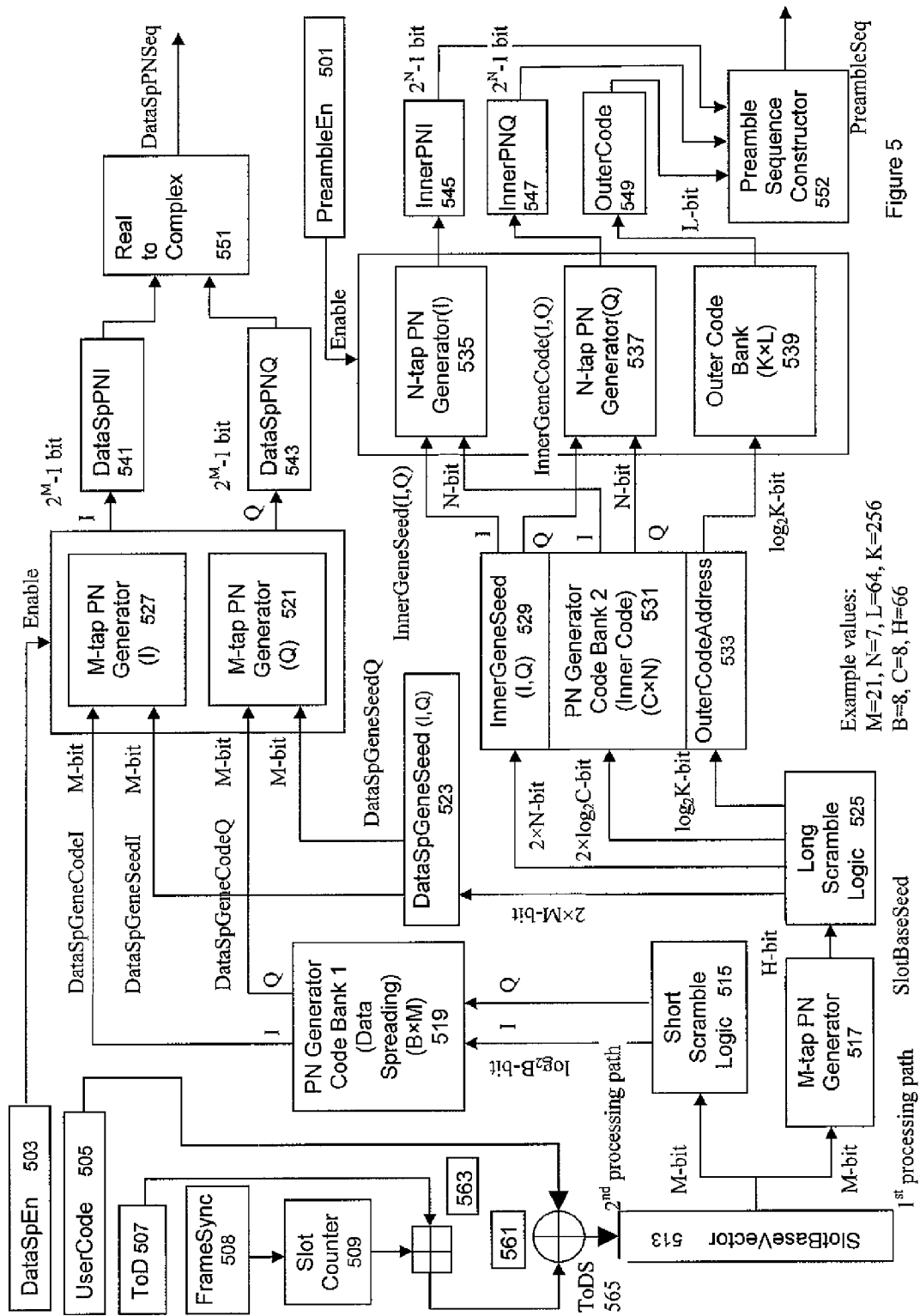
FIG. 5 depicts a block diagram view method of generating a preamble sequence and a PN spread sequence using User-Code and time-of-the day value in accordance with various embodiments.

FIG. 5 depicts a block diagram view of a method of generating a preamble and a payload data spreading PN sequences that dynamically change in accordance with various embodiments. The complex preamble sequence PreambleSeq, may be made up of InnerPNI 545, InnerPNQ 547, and OuterCode 549, and may be constructed in Preamble Sequence Constructor 552 by modulating InnerPNI and InnerPNQ with OuterCode. The payload data spreading PN sequence DataSpPNSeq, may be made up an in-phase component of DataSpPNI 541 and a quadrature component of DataSpPNQ 543. In embodiments there may be five inputs used for sequence generation: a preamble sequence generation enable signal PreambleEn 501, a data spreading PN sequence generation enable signal DataSpEn 503, a TDMA frame synchronization signal FrameSync 508, a user code UserCode 505, and a time of day ToD 507. These five inputs may allow the sequences to change on a slot-by-slot basis, and on a communicating node pair by node pair basis.

ToD 507 may be provided by a GPS device and may be updated every TDMA frame. A Slot Counter 509 may keep track of a current TDMA slot number within a TDMA frame. The slot count 509, after reset to zero by a control signal FrameSync 508, may increase by one at every TDMA slot. Time-of-day of current slot ToDS 565, may be updated at every TDMA slot, and may be calculated by adding ToD 507 with the Slot Counter 509. Every slot may use a unique ToDS 565 and UserCode 505 to generate preamble and data spreading PN sequences. ToDS 565 and UserCode 505, being identical between communicating pairs of communicating nodes, may be different from slot to slot and from time to time which may make it difficult to track the preamble sequence and data spreading PN sequence to be used in future time slots.

The ToDS and the UserCode may be combined using configurable bit-wise operation 561. In embodiments, the bit-wise operation may be an XOR (a bitwise exclusive OR). The bit-wise operation may generate an output of SlotBaseVector 513 with a length of M bits. This length may be determined by the repeating cycle of the payload data spreading PN sequences within a TDMA slot. In embodiments, M=21 may be selected.

The SlotBaseVector may be processed through two major paths. The first processing path may be configured to generate three sequences to be used for concatenated preamble sequence construction, including two inner code sequences at in-phase and quadrature channels, InnerPNI 545 and InnerPNQ 547, and an outer code sequence OuterCode 549. The concatenated preamble sequence may be constructed by modulating two inner code sequences (InnerPNI 545, InnerPNQ 547) with the outer code sequence (OuterCode 549), with each bit of an outer code sequence modulating entire inner code sequences. The second processing path may be configured to generate a PN spreading sequence for the payload data. The complex-number PN spreading sequence may comprise in-phase and quadrature components, i.e., DataSpPNI 541 DataSpPNQ 543. These components may be generated independently by two PN sequence generators, a M-tap PN Generator (I) 527 and a M-tap PN Generator (Q) 521, respectively.

The first processing path of SlotBaseVector 513 may use the SlotBaseVector as a seed to a M-tap PN Generator 517 to generate a SlotBaseSeed. The M-tap PN Generator 517 may use any M-tap PN sequence generator polynomial. The first H-bit binary output from the M-tap PN Generator 517 may be used by a Long Scramble Logic 525 as input to produce a binary output with identical length of H bits. The bit length of H may be determined by $H=2\times M+2\times N+2\times \log_2 C+\log_2 K$, wherein M is the length of M-tap PN generator 517, N is the length of the N-tap PN generator 535, C is the total number of entries in the PN Generator Code Bank 2 (Inner Code) block 531, and K is the total number of entries in the Outer Code Bank 539. In an embodiment, M=21, N=7, K=256, an C=8, which results in H=70. Long Scramble Logic 525 may be a logic operation that takes in H-bit input and generates H-bit output. In one embodiment, the logic operation may perform a bit re-ordering operation wherein bits at odd indexes may swap positions with bits at adjacent even indexes. In another embodiment, the logic operation may be separated into four different portions corresponding to four different output groups, with each portion having a different logic operation.

Long Scramble Logic 525 output may have a length of H bits. The first 2×M-bit output may be saved in DataSpGeneSeed (I, Q) 523; registers the second 2×N-bit output may be saved in InnerGeneSeed (I,Q) 529; registers the third 2×log$_2$ C-bit output may provide two addresses, each of log$_2$C bit long, that may provide access to PN Generator Code Bank 2 (Inner Code) 531; and the last output of length of log$_2$ K bits may be saved in OuterIndex 533 register. More details are described as below.

The first 2×M-bit output of Long Scramble Logic 525, saved in DataSpGeneSeed (I, Q) 523, may provide two independent initial seeds—DataSpGeneSeedI and DataSpGeneSeedQ—to M-tap PN Generator (I) 527 and M-tap PN Generator (Q) 521, respectively. The second 2×N-bit output of Long Scramble Logic 525, saved in InnerGeneSeed (I, Q) 529, may provide two independent initial seeds—InnerGeneSeed (I, Q)—to N-tap PN Generator (I) 535 and N-tap PN Generator (Q) 537, respectively. The third 2×log$_2$ C-bit output of Long Scramble Logic 525 may provide two addresses to select two PN sequence generator polynomials—InnerGeneCode (I, Q)—out of C entries in PN Generator Code Bank 2 531. The N-tap PN Generator (I) 535 and the N-tap PN Generator (Q) 537, upon receiving the preamble sequence generation enable signal from PreambleEn 501 may use PN sequence generator polynomials InnerGeneCode (I, Q) and two initial seeds InnerGeneSeed (I, Q) to generate two independent inner code sequences, InnerPNI 545 and InnerPNQ 547, each of which may have a period of $2^N-1$ bits. The initial seeds and PN sequence generator polynomials may change slot-by-slot so the generated inner code sequences may be different from one slot to another.

The PN Generator Code Bank 2 531 may be a database that stores a total of C entries of available PN sequence generator polynomials, each of which may be N bits in length. The PN Generator Code Bank 2 531 may be implemented as a Read-Only-Memory (ROM) of size of C×N bits. The stored PN sequence generator polynomials may be well-known PN sequence generator polynomials. In an embodiment, N=7 bits and C=8 entries may be selected.

The last $\log_2 K$ bits output from the Long Scramble Logic 525, saved in the OuterCodeAddress 533, may provide an address to choose an outer code sequence from the Outer Code Bank 539. The Outer Code Bank 539 may be a database that stores a total of K entries of available outer code sequences of length of L bits with desirable statistical properties. The Outer Code Bank 539 may be implemented as a Read-Only-Memory (ROM) with size of K×L bits.

The outer code sequences stored in the Outer Code Bank 539 may be generated a priori using an exhaustive search over all sequences of a given length of L bits. The search criteria may be that the maximal side-lobe of a-periodic autocorrelation function of a sequence is no larger than a threshold value THRESHOLD_SLOBE. Sequences with smaller side-lobes of a-periodic autocorrelation functions may provide comparatively lower false preamble synchronization probabilities at a receiver node. In an embodiment, K=256, L=64, and the threshold value THRESHOLD_SLOBE=7/64 may be selected.

The Preamble Sequence Constructor 552 may use two independent inner code sequences from InnerPNI 545 and InnerPNQ 547, and the outer code sequence from OuterCode 549 to generate a complex number preamble sequence. The preamble sequence may be a concatenated sequence, constructed from modulating entire inner code sequences at both in-phase and quadrature channels by each bit of the outer code sequence. The preamble sequence may be of length of L×($2^N-1$) bits. In an embodiment with L=64 and N=127, the length of the preamble sequence is 64×($2^7-1$)=8128 bits.

The second processing path of SlotBaseVector may go to a Short Scramble Logic 515. The Short Scramble Logic 515 may take M bits as input and produces two outputs, each of which may be $\log_2 B$ bits in length. The two outputs may be independent addresses that may choose two PN sequence generator polynomials, DataSpGeneCodeI and DataSpGeneCodeQ from all available B entries of PN sequence generator polynomials stored in a PN Generator Code Bank 1 519.

The PN Generator Code Bank 1 519 may be a database that stores a total of B entries of available PN sequence generator polynomials, each of which has a length of M bits. All B entries stored in PN Generator Code Bank 1 519 may be well-known M-tap PN sequence generator polynomials. The PN Generator Code Bank 1 519 may be implemented as a Read-Only-Memory (ROM) with size of B×M bits. In an embodiment, B=8 entries and M=21 bits may be selected.

The M-tap PN Generator (I) 527 and the M-tap PN Generator (Q) 521, upon enable signal from DataSpEn 503 that enables payload data spread modulation operation, may use two PN sequence generator polynomials DataSpGeneCode I and DataSpGeneCodeQ, made available from the second processing path, and two initial seeds DataSpGeneSeedI and DataSpGeneSeedQ, made available from the first processing path, to generate two independent payload data spreading PN sequences, DataSpPNI 541 and DataSpPPNQ 543, each of which has a period of $2^M-1$ bits. These two PN spreading sequences may be combined in Real To Complex 551 to form a complex-number data spreading PN sequence. The above-mentioned initial seeds and PN sequence generator polynomials may change slot by slot so that the PN sequence being generated to spread payload data may be different from one slot to another.

There may be three code banks in the structure, PN Generator Code Bank 1 (Data Spreading) 519, PN Generator Code Bank 2 (Inner Code) 531, and Outer Code Bank 539. The PN Generator Code Bank 1 (Data Spreading) 519 may provide random accessible PN sequence generator polynomials to control feedback logic connections of the M-tap PN Generator (I) 527 and the M-tap PN Generator (Q) 521 for generating data spreading PN sequence. The PN Generator Code Bank 2 (Inner Code) 531 may provide random accessible PN sequence generator polynomials to control feedback connections of the N-tap PN Generator (I) 535 and N-tap PN Generator (Q) 537 for generating inner codes for the concatenated preamble sequence. The Outer Code Bank 539 may store sequences that can be randomly accessed and used as an outer code in the concatenated preamble sequence. In embodiments, all three of the above code banks may be implemented in ROM, resulting in a hybrid sequence generation method that collaboratively utilizes ROM, internal logic, and external variables.

Figure 6:
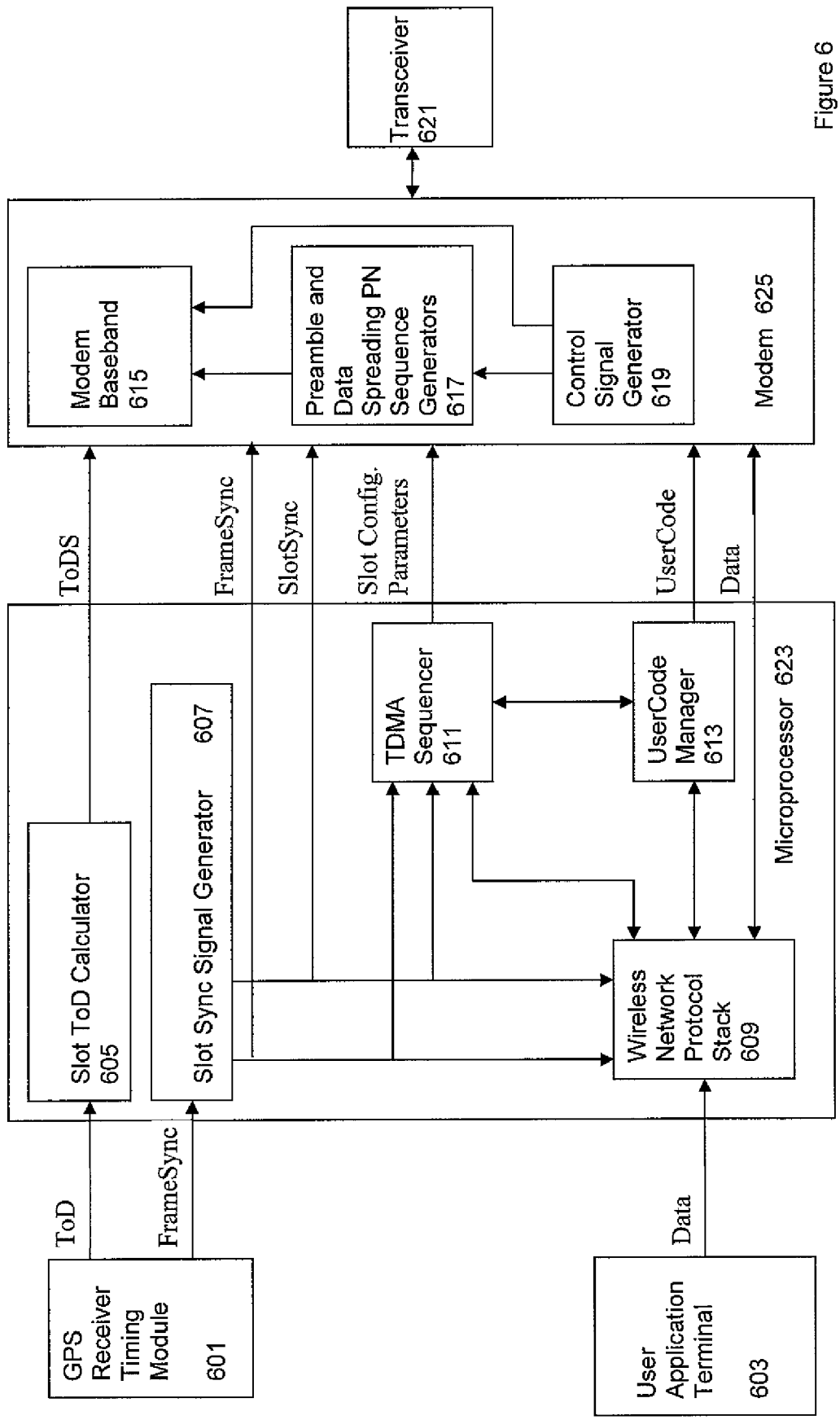
FIG. 6 depicts an exemplary wireless communication device capable of performing the operations of various embodiments.

FIG. 6 depicts an exemplary wireless communication device capable of performing the operations of various embodiments of the present disclosure. The embodiment disclosed makes up a communication node capable of transmitting and receiving slot based sequences in a DSSS communication system. At the beginning of a TDMA frame a GPS Receiver Timing Module 601 may receive a signal from a GPS system, and the module may pass the ToD of the current TDMA frame to a Slot ToD Calculator 605. Every node connecting to the communication system may receive an identical ToD signal, allowing any calculation using the ToD to be identically reproducible. The GPS Receiver Timing Module 601 may also pass a timing synchronization signal FrameSync to the Slot Sync Generator 607; for controlling slot synchronization. Slot ToD Calculator 605 may convert the frame-based ToD into a slot-by-slot time-of-the-day ToDS that may be used by Modem 625. Specifically, the modem's component parts, Modem baseband 615, Preamble and Data Spreading PN Sequence Generators 617, and Control Signal Generator 619, may use the slot-by-slot time-of-the-day ToDS.

The Preamble and Data Spreading PN Sequence Generators 617, may use the ToDS and UserCode from UserCode Manager 613, and may generate the concatenated preamble sequence and the data spreading PN sequence for DSSS communication within the current slot. Such use may be, in embodiments, in accordance with the procedures depicted elsewhere within this application and in FIG. 5.

Component parts of Microprocessor 623 may include Slot ToD Calculator 605, Slot Sync Generator 607, Wireless Network Protocol Stack 609, TDMA Sequencer 611, and UserCode Manager 613. Slot Sync Generator 607 may receive a TDMA frame synchronization timing signal, FrameSync, from the GPS Receiver Timing Module 601 and pass FrameSync signal to Wireless Network Protocol Stack 609, Modem 625, and TDMA Sequencer 611. Slot Sync Generator 607 may also generate a slot synchronization signal, SlotSync, that may be used by Wireless Network Protocol Stack 609, Modem 625, and TDMA Sequencer 611. Wireless Network Protocol Stack 609 may communicate payload data between Modem 625 and User Application Terminal 603. Wireless Network Protocol Stack 609 may provide UserCode Manager 613 with the UserCode obtained from network protocols that may perform handshaking between the distributed wireless node pairs. UserCode Manager 613 may maintain and update a database of UserCode entries, with each UserCode unique to a particular communication node pair. TDMA Sequencer 611 having obtained frame and slot synchronization signals, and necessary information from Wireless Network Protocol Stack 609 may be able to instruct UserCode Manager 613 in terms of which UserCode may be used for wireless communication for the current TDMA slot, and to transfer Slot Configuration Parameters to Modem 625. Modem 625 may receive the UserCode, Slot Configuration Parameters, SlotSync signal, FrameSync signal, and the ToDS value. Using these received information, Control Signal Generator 619 and Preamble and Data Spreading PN Sequence Generators 617 may be able to generate the preamble and the data spreading PN sequences and other control signals to be used by the Modem Baseband 615 for slot-based DSSS communication. Modem Baseband 615 may communicate with the wireless communication fabric 113 via Transceiver 621.

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the disclosure. Those with skill in the art will readily appreciate that the present disclosure may be implemented in a very wide variety of embodiments. This application is intended to cover any adaptations or variations of the embodiments discussed herein. Therefore, it is manifestly intended that this disclosure be limited only by the claims and the equivalents thereof.

What is claimed:

1. A method of generating synchronized preamble and data spreading PN sequences for Time Division Multiple Access (TDMA) slot synchronization among distributed wireless communication nodes comprising:
   (a) obtaining by a component of one of the communication nodes, a user code (UserCode) that is shared by the communication node with another communication node with which the communication node communicates in accordance with a TDMA communication protocol, the obtaining being from a source external to the communication node beside the other communication node;
   (b) obtaining by the component a Time-of Day (ToD) value at a start of a TDMA frame from the same or another source external to the communication node beside the other communication node; and
   (c) performing one or more computations by the communication node to dynamically change a preamble sequence (PreambleSeq) and a payload data spreading PN sequence (DataSpPNSeq) of a communication slot when communicating with the other communication node in accordance with said TDMA communication protocol, the one or more computations being based at least in part on the UserCode and the ToD enabling the sequences to be effectively synchronized with the other communication node, the one or more computations including separately generating two independent data spreading PN sequences, DataSpPN (I,Q), for the communication slot, the separately-generated I sequence representing the sequence for spreading an in-phase component of a quadrature phase shift keying (QPSK) modulated signal, the separately-generated Q sequence representing the sequence for spreading a quadrature component of the QPSK-modulated signal;
   the computations further including:
      generating a SlotBaseSeed at a slot rate for the communication slot;
      determining a first address to select a DataSpGeneCodeI and a second address to select a DataSpGeneCodeQ from a PN Generator Code Bank for the communication slot; and
      determining initial seeds of DataSpGeneSeedI, DataSpGeneSeedQ, InnerGeneSeedI and InnerGeneSeedQ, feedback logic connection polynomials InnerGeneCodeI and InnerGeneCodeIQ, and an OuterCodeAddress for the communication slot.

2. The method of claim 1, wherein the one or more computations include one or more of:
   (a) generating a SlotBaseVector at a start of the communication slot;
   (e) generating two inner PN sequences in a preamble, InnerPN (I,Q), for the communication slot; and
   (f) determining an OuterCode for the communication slot.

3. The method of claim 2, wherein the one or more computations comprise all enumerated computations.

4. The method of claim 1, wherein the one or more computations further include one or more of:
   (a) using said UserCode and a FrameSync control signal to generate ToDS;
   (b) performing a configurable bit-wise operation on said UserCode and ToDS to generate a SlotBaseVector at a start of the communication slot;
   (c) seeding a Pseudo Number (PN) generator with a SlotBaseVector to generate a SlotBaseSeed for the communication slot;
   (d) using a SlotBaseVector and a Short Scramble Logic to determine two addresses to select a DataSpGeneCodeI and a DataSpGeneCodeQ for the communication slot;
   (e) using a SlotBaseSeed and a Long Scramble Logic to determine initial seeds DataSpGeneSeedI and DataSpGeneSeedQ, initial seeds InnerGeneSeedI and InnerGeneSeedQ, two feedback logic connection polynomials InnerGeneCodeI and InnerGeneCodeIQ, and a OuterAddress for the communication slot;
   (f) using a DataSpGeneCode (I,Q) and a DataSpGeneSeed (I,Q) to generate the two data spreading PN sequences, DataSpPN (I,Q) for the communication slot;
   (g) using a InnerGeneCode (I,Q) and a InnerGeneSeed (I,Q) to generate two inner PN sequences in a preamble, InnerPN (I,Q) for the communication slot; and
   (h) using an OuterAddress with an Outer Code Bank to determine a corresponding OuterCode for the communication slot.

5. The method of claim 4, wherein said SlotBasedVector is described by the equation:

$$SlotBasedVector = UserCode \; XOR \; ToDS$$

Where XOR is bitwise exclusive OR.

6. The method of claim 4, wherein the one or more computations comprise all enumerated computations.

7. The method of claim 1 further comprising generating by the component PN sequences for the communication slot, the PN sequences being effectively synchronized with the other communication node.

8. The method of claim 7, wherein said generating of PN sequences comprises using Long and Short Scramble Logic identical to Long and Short Scramble Logic used by the other communication node to generate corresponding PN sequences for the other communication node.

9. The method of claim 1 further comprising generating by the component non-PN sequences for the communication slot, the non-PN sequences being effectively synchronized with the other communication node.

10. The method of claim 9, wherein said generating of non-PN sequences comprises using Long and ShortScramble Logic identical to Long and Short Scramble Logic used by the other communication node to generate corresponding PN sequences for the other communication node.

11. The method of claim 1 further comprising repeating by the component said obtaining ToD operation and said performing of one or more computations for another communication slot.

12. The method of claim 1, wherein said TDMA communication protocol comprises a Direct Sequence Spread Spectrum (DSSS) protocol.

13. The method of claim 1, wherein said obtaining of the UserCode comprises obtaining the UserCode from a communication service provider facilitating communication between the communication nodes.

14. The method of claim 1, wherein said obtaining of the ToD comprises obtaining the ToD from a Global Positioning System.

15. A communication node comprising:
a transceiver to transmit and receive communication signals, to and from another communication node;
a controller coupled to the transceiver to control the transceiver to transmit and receive the communication signals in accordance with a Time Division Multiple Access (TMDA) communication protocol, the controller configured to:
obtain a user code (UserCode) that is shared with the other communication node, the obtaining being from a source external to the communication node beside the other communication node;
obtain a Time-of Day (ToD) value at a start of a TDMA frame from the same or another source external to the communication node beside the other communication node; and
perform one or more computations to dynamically change a preamble sequence (PreambleSeq) and a payload data spreading PN sequence (DataSpPNSeq) of a communication slot when communicating with the other communication node in accordance with said TDMA communication protocol, the one or more computations being based at least in part on the User-Code and the ToD enabling the sequences to be effectively synchronized with the other communication node, the one or more computations including separately generating two independent data spreading PN sequences, DataSpPN (I,Q), for the communication slot, the separately-generated I sequence representing the sequence for spreading an in-phase component of a quadrature phase shift keying (QPSK) modulated signal, the separately-generated Q sequence representing the sequence for spreading a quadrature component of the QPSK-modulated signals;
the computations further including:
generating a SlotBaseSeed at a slot rate for the communication slot;
determining two addresses to select a DataSpGeneCodeI and a DataSpGeneCodeQ from a PN Generator Code Bank for the communication slot;
determining two initial seeds DataSpGeneSeed (I, Q), two initial seeds InnerGeneSeed (I, Q), two feedback logic connection polynomials InnerGeneCode (I, Q), and an OuterCodeAddress for the communication slot.

16. The communication node of claim 15, wherein the controller is configured to perform at least one of:
generating a SlotBaseVector at a start of the communication slot;
generating two inner PN sequences in a preamble, InnerPN (I,Q), for the communication slot; and
determining an OuterCode for the communication slot.

17. The communication node of claim 15, wherein the controller is configured to perform at least one of:
using said UserCode and a FrameSync control signal to generate ToDS;
performing a configurable bit-wise operation on said UserCode and ToDS to generate a SlotBaseVector at a start of the communication slot;
seeding a Pseudo Number (PN) generator with a SlotBaseVector to generate a SlotBaseSeed for the communication slot;
using a SlotBaseVector and a Short Scramble Logic to determine two addresses to select a DataSpGeneCodeI and a DataSpGeneCodeQ for the communication slot;
using a SlotBaseSeed and a Long Scramble Logic to determine initial seeds DataSpGeneSeedI and DataSpGeneSeedQ, initial seeds InnerGeneSeedI and InnerGeneSeedQ, feedback logic connection polynomials InnerGeneCodeI and InnerGeneCodeIQ, and an OuterAddress for the communication slot;
using a DataSpGeneCode (I,Q) and a DataSpGeneSeed (I,Q) to generate the two data spreading PN sequences, DataSpPN (I,Q) for the communication slot;
using a InnerGeneCode (I,Q) and a InnerGeneSeed (I,Q) to generate two inner PN sequences in a preamble, InnerPN (I,Q) for the communication slot; and
using an OuterAddress with an Outer Code Bank to determine a corresponding OuterCode for the communication slot.

18. The communication node of claim 15, wherein the controller comprises Long and Short Scramble Logic, and is further configured to use the Long and Short Scramble Logic to generate PN sequences for the communication node, the Long and Short Scramble Logic being identical to the Long and Short Scramble Logic used by the other communication node to generate corresponding PN sequences for the other communication node.

19. The communication node of claim 15, wherein the controller comprises Long and Short Scramble Logic, and is further configured to use the Long and Short Scramble Logic to generate non-PN sequences for the communication node, the Long and Short Scramble Logic being identical to Long and Short Scramble Logic used by the other communication node to generate corresponding non-PN sequences for the other communication node.

20. The communication node of claim 15, wherein the controller is further configured to perform said obtaining ToD operation and said one or more computations for each communication slot, on a slot-by-slot basis.

21. The communication node of claim 15, wherein the controller is configured to operate the transceiver in accordance with a TDMA communication protocol including a Direct Sequence Spread Spectrum (DSSS) protocol.

22. The communication node of claim 15, wherein the controller is configured to obtain the UserCode from a communication service provider facilitating communication between the communication nodes.

23. The communication node of claim 15, wherein the controller is configured to obtain the ToD comprises obtaining the ToD from a Global Positioning System.

24. A communication system comprising:
 a first and a second communication node configured to communicate with each other in accordance with a Time Division Multiple Access (TDMA) communication protocol;
 wherein each communication node is configured to
  obtain a user code (UserCode) that is shared with the other communication node, the obtaining being from a source external to the communication node beside the other communication node;
  obtain a Time-of Day (ToD) value at a start of a TDMA frame from the same or another source external to the communication node beside the other communication node; and
  perform one or more computations to dynamically change a preamble sequence (PreambleSeq) and a payload data PN spreading sequence (DataSpPNSeq) of a communication slot when communicating with the other communication node in accordance with said TDMA communication protocol, the one or more computations being based at least in part on the UserCode and the ToD enabling the sequences to be effectively synchronized with the other communication node, the one or more computations including separately generating two independent data spreading PN sequences, DataSpPN (I,Q), for the communication slot, the separately-generated I sequence representing the sequence for spreading an in-phase component of a quadrature phase shift keying (QPSK) modulated signal, the separately-generated Q sequence representing the sequence for spreading a quadrature component of the QPSK-modulated signals
 the computations further including:
  generating a SlotBaseSeed at a slot rate for the communication slot;
  determining a first address to select a DataSpGeneCodeI and a second address to select a DataSpGeneCodeQ from a PN Generator Code Bank for the communication slot; and
  determining initial seeds of DataSpGeneSeedI, DataSpGeneSeedQ, InnerGeneSeedI and InnerGeneSeedQ, feedback logic connection polynomials InnerGeneCodeI and InnerGeneCodeIQ, and an OuterCodeAddress for the communication slot.

25. The communication system of claim 24 further comprises a communication service provider from which the communication nodes obtain the UserCode.

* * * * *